United States Patent
Yang (10) Patent No.: US 9,866,947 B2
(45) Date of Patent: Jan. 9, 2018

(54) DUAL-MICROPHONE HEADSET AND NOISE REDUCTION PROCESSING METHOD FOR AUDIO SIGNAL IN CALL

(71) Applicant: Huawei Device Co., Ltd., Shenzhen (CN)

(72) Inventor: Haiquan Yang, Shanghai (CN)

(73) Assignee: Huawei Device Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/125,841

(22) PCT Filed: Mar. 14, 2014

(86) PCT No.: PCT/CN2014/073448
§ 371 (c)(1),
(2) Date: Sep. 13, 2016

(87) PCT Pub. No.: WO2015/135201
PCT Pub. Date: Sep. 17, 2015

(65) Prior Publication Data
US 2017/0006372 A1   Jan. 5, 2017

(51) Int. Cl.
*H04R 1/10* (2006.01)
*H04M 9/08* (2006.01)
(Continued)

(52) U.S. Cl.
CPC ........ *H04R 1/1075* (2013.01); *H04M 1/6058* (2013.01); *H04M 9/082* (2013.01);
(Continued)

(58) Field of Classification Search
CPC ...... H04R 1/1083; H04R 5/04; H04R 1/1075; H04R 2410/05; H04R 2460/01; H04M 1/6058; H04M 1/6033; H04M 1/6008
(Continued)

(56) References Cited

U.S. PATENT DOCUMENTS 8,363,823 B1    1/2013  Santos
2007/0177741 A1  8/2007  Williamson
(Continued)

FOREIGN PATENT DOCUMENTS

CN    2643585 Y     9/2004
CN    201708849 U   1/2011
(Continued)

OTHER PUBLICATIONS

International Search Report issue in International Application No. PCT/CN2014/073448 dated Dec. 26, 2014, 4 pages.
(Continued)

*Primary Examiner* — Melur Ramakrishnaiah
(74) *Attorney, Agent, or Firm* — Fish & Richardson P.C.

(57) ABSTRACT

The present invention discloses a headset, a terminal, and a method for processing an audio signal based on the headset and the terminal. The method for processing an audio signal includes: acquiring, by a first microphone of a headset in a call process, a first audio signal including a call voice and background noise, and acquiring, by a second microphone of the headset in the call process, a second audio signal including the background noise; and transmitting, by using an external plug of the headset, the first audio signal and the second audio signal to a noise reduction chip built in a terminal, so that the noise reduction chip performs noise reduction processing on the first audio signal according to the second audio signal.

20 Claims, 4 Drawing Sheets

(51) Int. Cl.
 H04R 5/033 (2006.01)
 H04M 1/60 (2006.01)
 H04R 3/00 (2006.01)
(52) U.S. Cl.
 CPC ........... H04R 1/1083 (2013.01); H04R 5/033 (2013.01); *H04M 1/6008* (2013.01); *H04M 1/6033* (2013.01); *H04R 3/005* (2013.01); *H04R 2410/05* (2013.01); *H04R 2460/01* (2013.01)
(58) Field of Classification Search
 USPC ........... 381/74, 94.1, 150; 704/227; 455/570
 See application file for complete search history.

(56) References Cited

U.S. PATENT DOCUMENTS

| | | | |
|---|---|---|---|
| 2008/0201138 A1* | 8/2008 | Visser | G10L 21/0208 704/227 |
| 2009/0179768 A1 | 7/2009 | Sander et al. | |
| 2010/0022283 A1* | 1/2010 | Terlizzi | H04M 1/05 455/570 |
| 2010/0062713 A1* | 3/2010 | Blamey | H04M 9/082 455/41.3 |
| 2011/0116646 A1 | 5/2011 | Sander et al. | |
| 2013/0259255 A1 | 10/2013 | Schul et al. | |

FOREIGN PATENT DOCUMENTS

| | | |
|---|---|---|
| CN | 202798859 U | 3/2013 |
| CN | 103079144 A | 5/2013 |
| CN | 1003533475 A | 1/2014 |

OTHER PUBLICATIONS

Voclear Dual Microphone Noise Reduction Somic g938 Headphones Evaluation, Yesky.com May 28, 2013; http://Speaker.yesky.com/181/34866681.shtml, 4 pages; 5 pages machine translation.
Extended European Search Report issued in European Application No. 148856362 dated Feb. 2, 2017, 7 pages.

* cited by examiner

DUAL-MICROPHONE HEADSET AND NOISE REDUCTION PROCESSING METHOD FOR AUDIO SIGNAL IN CALL

CROSS-REFERENCE TO RELATED APPLICATIONS

This application is a National Stage of International Application No. PCT/CN2014/073448, filed on Mar. 14, 2014, which is hereby incorporated by reference in its entirety.

TECHNICAL FIELD

The present invention relates to the field of communications technologies, and in particular, to a dual-microphone headset and a noise reduction processing method for an audio signal in a call.

BACKGROUND

In a normal call process, an audio signal acquired by a microphone of a communication terminal such as a mobile phone not only includes a call voice of a calling party (a called party) but also includes background noise in a current call environment. In order to improve call quality, noise reduction processing needs to be performed on the audio signal in the call process.

Currently, it is relatively popular that dual MICs (Microphone, microphone) are disposed on a body of a mobile phone to perform noise reduction processing, and a main working principle of the dual MICs is: A primary MIC is disposed at the top of the mobile phone and a secondary MIC is disposed at the bottom. During a call, the primary MIC is placed near a mouth of a calling party to acquire a call voice and background noise, and at the same time, the secondary MIC is placed far away from the mouth of the calling party and acquires only the background noise. The primary MIC and the secondary MIC transmit acquired audio signals to a noise reduction chip, so that the noise reduction chip performs, according to the background noise acquired by the secondary MIC, filtering processing on the audio signal acquired by the primary MIC, thereby achieving an objective of eliminating the background noise and retaining only the call voice.

However, when a calling party and/or a called party uses a headset for a call, because dual MICs are both disposed on a mobile phone and are both turned off during the call, only one MIC disposed on the headset cannot independently acquire background noise, and certainly noise reduction processing cannot be performed according to the background noise. In addition, a dual-MIC headset on which a primary MIC and a secondary MIC are disposed is commercially available. However, the headset performs, by using a noise reduction chip disposed in the headset and according to an audio signal acquired by the secondary MIC, noise reduction processing on an audio signal acquired by the primary MIC. Because a cost of the noise reduction chip is excessively high, a cost of the entire headset becomes relatively high, making popularization difficult.

SUMMARY

In view of this, embodiments of the present invention provide a dual-microphone headset and a noise reduction processing method for an audio signal in a call, so that when a headset is used for a call, a terminal can perform noise reduction processing on an audio signal acquired by the headset, so that while call quality is improved, a cost can also be lowered, thereby facilitating popularization.

A first aspect provides a method for processing an audio signal of a headset, where the headset includes a first microphone, a second microphone, and an external plug configured to connect to an external terminal, a noise reduction chip is built in the external terminal, and the method for processing an audio signal includes: acquiring, by the first microphone in a call process, a first audio signal including a call voice and background noise, and acquiring, by the second microphone in the call process, a second audio signal including the background noise; and transmitting the first audio signal and the second audio signal to the noise reduction chip by using the external plug, so that the noise reduction chip performs noise reduction processing on the first audio signal according to the second audio signal.

With reference to the implementation manner of the first aspect, in a first possible implementation manner, the headset includes a left-ear headset unit, a right-ear headset unit, and an inline control module, the second microphone is disposed on the left-ear headset unit or the right-ear headset unit, and the first microphone is disposed on the inline control module.

With reference to the implementation manner of the first aspect, in a second possible implementation manner, the external plug includes a first microphone port and a second microphone port, and the step of transmitting the first audio signal and the second audio signal to the noise reduction chip by using the external plug includes: transmitting the first audio signal to the noise reduction chip by using the first microphone port of the external plug; and transmitting the second audio signal to the noise reduction chip by using the second microphone port of the external plug.

With reference to the implementation manner of the first aspect, in a third possible implementation manner, the external plug includes a microphone port, and the step of transmitting the first audio signal and the second audio signal to the noise reduction chip by using the external plug includes: performing analog-to-digital conversion on the first audio signal and the second audio signal; performing data encapsulation on the first audio signal and the second audio signal on which analog-to-digital conversion is performed, to obtain a serial digital signal; and transmitting the serial digital signal to the external terminal by using the microphone port of the external plug.

A second aspect provides a headset, including a first microphone, a second microphone, and an external plug configured to connect to an external terminal, where a noise reduction chip is built in the external terminal, the first microphone is configured to acquire, in a call process, a first audio signal including a call voice and background noise, and the second microphone is configured to acquire, in the call process, a second audio signal including the background noise; and the headset further includes a signal output module, configured to transmit the first audio signal and the second audio signal to the noise reduction chip by using the external plug, so that the noise reduction chip performs noise reduction processing on the first audio signal according to the second audio signal.

With reference to the implementation manner of the second aspect, in a first possible implementation manner, the headset further includes a left-ear headset unit, a right-ear headset unit, and an inline control module, the second microphone is disposed on the left-ear headset unit or the right-ear headset unit, and the first microphone is disposed on the inline control module.

With reference to the implementation manner of the second aspect, in a second possible implementation manner, the external plug includes a first microphone port and a second microphone port that respectively correspond to the first microphone and the second microphone; and the signal output module is configured to transmit the first audio signal to the noise reduction chip by using the first microphone port and transmits the second audio signal to the noise reduction chip by using the second microphone port.

With reference to the implementation manner of the second aspect, in a third possible implementation manner, the external plug includes a microphone port, and the headset further includes an analog-to-digital conversion module and a signal encapsulation module, where the analog-to-digital conversion module is configured to perform analog-to-digital conversion on the first audio signal and the second audio signal; the signal encapsulation module is configured to perform data encapsulation on the first audio signal and the second audio signal on which analog-to-digital conversion is performed, to obtain a serial digital signal; and the signal output module is configured to transmit the serial digital signal to the external terminal by using the microphone port.

A third aspect provides a method for processing an audio signal of a terminal, where the terminal includes a built-in noise reduction chip and an external socket configured to connect to an external plug of a headset, and the headset includes a first microphone and a second microphone; and the method for processing an audio signal includes: receiving, by using the external socket, an input signal transmitted by the headset, where the input signal includes a first audio signal that is acquired by the first microphone in a call process and that includes a call voice and background noise and a second audio signal that is acquired by the second microphone and that includes the background noise; acquiring the first audio signal and the second audio signal according to the input signal; and performing, by the noise reduction chip, noise reduction processing on the first audio signal according to the second audio signal.

With reference to the implementation manner of the third aspect, in a first possible implementation manner, the external plug includes a first microphone port and a second microphone port that respectively correspond to the first microphone and the second microphone, the external socket includes a first microphone interface corresponding to the first microphone port and a second microphone interface corresponding to the second microphone port, and the step of receiving, by using the external socket, an input signal transmitted by the headset and the step of acquiring the first audio signal and the second audio signal according to the input signal include: receiving, by using the first microphone interface, the first audio signal transmitted by the first microphone port and receiving, by using the second microphone interface, the second audio signal transmitted by the second microphone port.

With reference to the implementation manner of the third aspect, in a second possible implementation manner, the external plug includes a microphone port, the external socket includes a microphone interface corresponding to the microphone port, and the step of receiving, by using the external socket, an input signal transmitted by the headset and the step of acquiring the first audio signal and the second audio signal according to the input signal include: receiving, by using the microphone interface, the input signal transmitted by the microphone port; identifying whether the input signal is a serial digital signal including the first audio signal and the second audio signal; and demodulating the input signal if the input signal is a serial digital signal including the first audio signal and the second audio signal, to obtain the first audio signal and the second audio signal that are included in the serial digital signal.

A fourth aspect provides a terminal, where the terminal includes a built-in noise reduction chip and an external socket configured to connect to an external plug of a headset, and the headset includes a first microphone and a second microphone; and the terminal further includes: a signal receiving module, configured to receive, by using the external socket, an input signal transmitted by the headset, where the input signal includes a first audio signal that is acquired by the first microphone in a call process and that includes a call voice and background noise and a second audio signal that is acquired by the second microphone and that includes the background noise; a signal acquisition module, configured to acquire the first audio signal and the second audio signal according to the input signal; and a signal processing module, configured to control the noise reduction chip to perform noise reduction processing on the first audio signal according to the second audio signal.

With reference to the implementation manner of the fourth aspect, in a first possible implementation manner, the external plug includes a first microphone port and a second microphone port that respectively correspond to the first microphone and the second microphone, the external socket includes a first microphone interface corresponding to the first microphone port and a second microphone interface corresponding to the second microphone port, and the signal receiving module is configured to receive, by using the first microphone interface, the first audio signal transmitted by the first microphone port, receive, by using the second microphone interface, the second audio signal transmitted by the second microphone port, and transmit the first audio signal and the second audio signal to the signal acquisition module.

With reference to the implementation manner of the fourth aspect, in a second possible implementation manner, the external plug includes a microphone port, the external socket includes a microphone interface corresponding to the microphone port, and the terminal further includes a signal identification module, where the signal identification module is configured to identify whether the input signal received by the signal receiving module is a serial digital signal including the first audio signal and the second audio signal; and the signal acquisition module demodulates the input signal if the input signal received by the signal receiving module is a serial digital signal including the first audio signal and the second audio signal, to obtain the first audio signal and the second audio signal that are included in the serial digital signal.

By means of the foregoing technical solution, in a call process, in the present invention, the first microphone disposed on the headset acquires a first audio signal including a call voice and background noise, and the second microphone disposed on the headset acquires a second audio signal including the background noise, so that the headset can independently acquire the background noise, so that the noise reduction chip can perform filtering processing on the first audio signal including the call voice and the background noise according to the background noise, thereby implementing noise reduction processing of eliminating the background noise and keeping only the call voice, and improving call quality. In addition, in the present invention, a new noise reduction chip does not need to be added on the headset, and the noise reduction chip built in the terminal is used to complete noise reduction processing. Therefore, a cost is relatively low, thereby facilitating popularization.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The present invention provides a method for processing an audio signal. Refer to a flowchart of a method for processing an audio signal according to a first embodiment of the present invention shown in FIG. 1. The method for processing an audio signal of this embodiment is based on a headset 10 and a terminal (an external terminal) 20 that are shown in FIG. 2, and the headset 10 and the terminal 20 implement electric connection by using a pin structure 30, where a noise reduction chip 21 is built in the terminal 20, and the pin structure 30 includes an external plug 31 disposed on one side of the headset 10 and an external socket 32 disposed on one side of the terminal 20.

Preferably, in this embodiment, the headset 10 further includes, in addition to the external plug 31 configured to connect to the terminal 20, an inline control module 40, a left-ear headset unit 50, and a right-ear headset unit 60, where the inline control module 40 is provided with a first microphone M1 and a volume adjustment button (not shown in the figure), and the volume adjustment button is configured to adjust magnitude of a call volume or a music playing volume.

Preferably, the right-ear headset unit 60 includes a right-channel headset (a right loudspeaker) S1; the left-ear headset unit 50 includes a second microphone M2 and a left-channel headset (a left loudspeaker) S2; in this case, a person skilled in the art may regard the second microphone M2 as a single-channel microphone. Further, the second microphone M2 and the left-channel headset S2 have desirable acoustic isolation.

Certainly, in other embodiments, the second microphone M2 may be disposed on the right-ear headset unit 60 by a person skilled in the art, that is, the right-ear headset unit 60 includes the right-channel headset S1 and the second microphone M2, and the left-ear headset unit 50 includes the left-channel headset S2. In this case, the second microphone M2 and the right-channel headset S1 have desirable acoustic isolation.

It should be noted that the headset 10 mentioned in the entire text of the present invention is described by using a 3.5-mm wired headset as an example; however, the headset 10 is not limited thereto, and can be any headset of any model that has a voice call function, for example, a binaural microphone stereo headset and a wireless Bluetooth headset. In addition, the terminal 20 is described by using a smartphone as an example; however, the terminal is also not limited to a smartphone, and can be any terminal having a call function, for example, a tablet computer, a personal digital assistant (PDA), and a portable communication apparatus. Similarly, the first microphone M1 and the second microphone M2 are both described by using microphones as examples. Based on the above, for better understanding, a person skilled in the art may regard the first microphone M1 as a primary MIC in the prior art and regard the second microphone M2 as a secondary MIC in the prior art.

Figure 1:
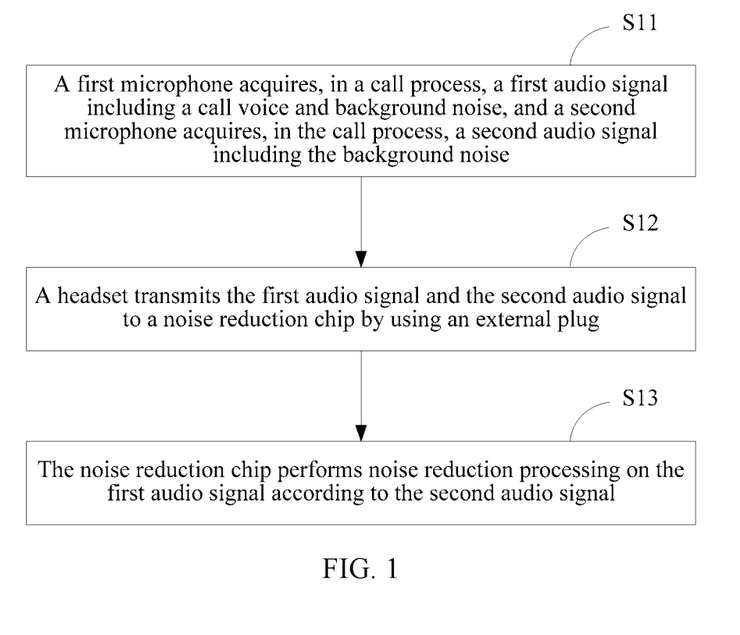
FIG. 1 is a flowchart of a method for processing an audio signal according to a first embodiment of the present invention.
Figure 2:
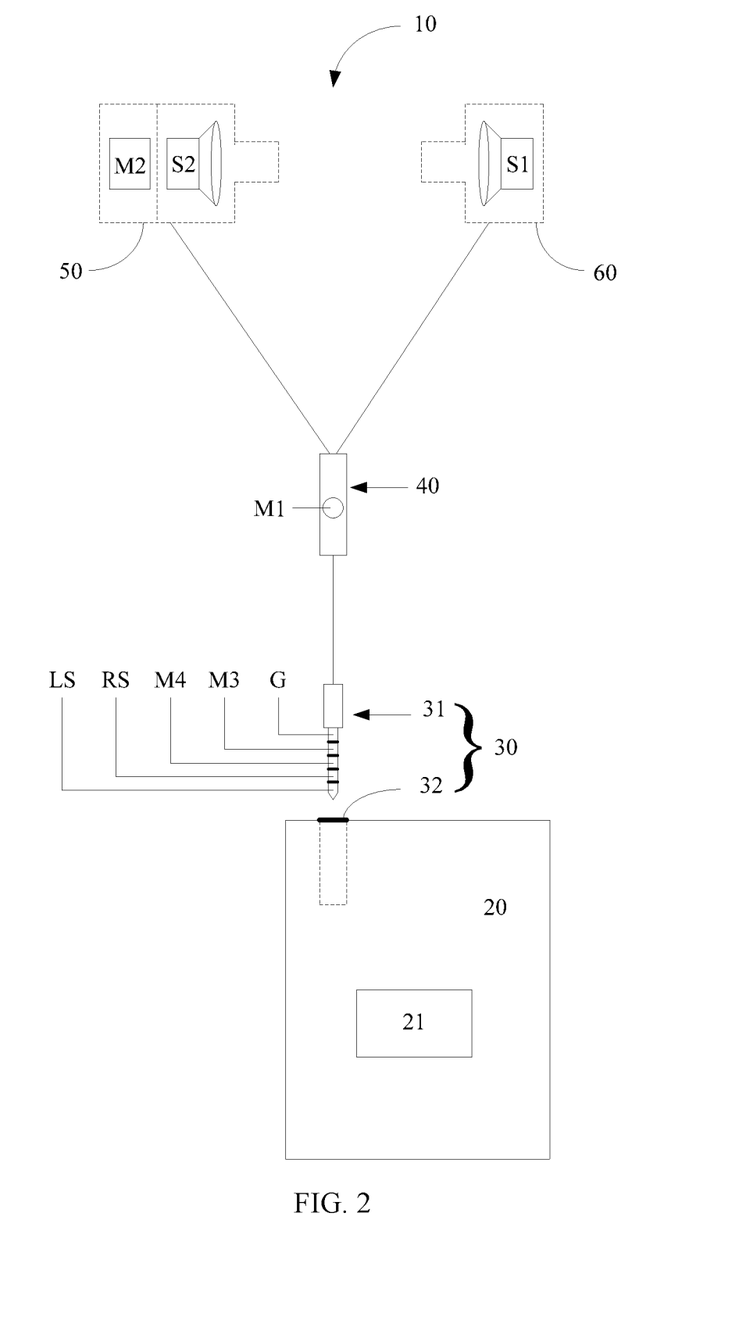
FIG. 2 is a schematic structural diagram of a preferred embodiment of a headset and a terminal according to the present invention.

As shown in FIG. 1, the method for processing an audio signal of this embodiment includes:

S11: A first microphone acquires, in a call process, a first audio signal including a call voice and background noise, and a second microphone acquires, in the call process, a second audio signal including the background noise.

Referring to FIG. 2, the first microphone M1 and the second microphone M2 separately collect sound information in an ambient sound field in real time and simultaneously collect the sound information in the ambient sound field. Specifically:

In a call process, because a headset cable hangs down naturally, the first microphone M1 is near mouths (sound sources) of a calling party and a called party, to acquire the call voice and the background noise and use the call voice and the background noise as the first audio signal. Because the second microphone M2 is set disposed at an earplug (the left-ear headset unit 50) and is far away from the mouths of the calling party and the called party, the second microphone M2 acquires only the background noise and uses the background noise as the second audio signal.

S12: A headset transmits the first audio signal and the second audio signal to a noise reduction chip of the terminal by using an external plug.

In this embodiment, the headset 10 transmits the first audio signal and the second audio signal to the terminal 20 by using the external plug 31 of the pin structure 30. Preferably, the external plug 31 is a five-segment pin structure, that is, includes, sequentially along a direction of plug connection to the external socket 32, a grounding port G, a first microphone port M3 connected to the first microphone M1, a second microphone port M4 connected to the second microphone M2, and a left-channel port LS and a right-channel port RS that are respectively correspondingly connected to the left-channel headset S2 and the right-channel headset S1. Correspondingly, the external socket 32 includes interface structures adapted to the ports of the external plug 31, for example, includes a first microphone interface adapted to the first microphone port M3 and a second microphone interface adapted to the second microphone port M4.

It should be noted that a location sequence of the grounding port G, the first microphone port M3, the second microphone port M4, the left-channel port LS, and the right-channel port RS of the external plug 31 shown in FIG. 2 is used as only an example for illustration, and a person skilled in the art may perform other settings in other embodiments according to actual requirements.

In addition, in this embodiment, further preferably, the audio signal transmitted by the headset 10 to the terminal 20 by using the external plug 31 is an analog signal, that is, the first audio signal and the second audio signal respectively correspond to a first audio analog signal and a second audio analog signal. In actual application scenarios, the first audio signal and the second audio signal output by the headset 10 are specifically represented as voltage values; the terminal 20 detects a voltage value of the external socket 32 to acquire the first audio signal and the second audio signal and transmits the first audio signal and the second audio signal to the noise reduction chip 21 by using an internal next circuit; certainly, the external socket 32 may be directly electrically connected to the noise reduction chip 21, so as to directly transmit the first audio signal and the second audio signal to the noise reduction chip 21.

Further, in a call process, because complete acoustic isolation cannot be implemented between the second microphone M2 and the left-channel headset S2 of the headset 10, in this embodiment, preferably, adaptive echo cancellation (Adaptive Echo Cancellation, AEC) is performed on the background noise collected by the second microphone M2, to eliminate a collected sound made by the left-channel headset S2 and use the processed background noise as the second audio signal. Similarly, because there is quite a distance between the mouth of the calling party and the first microphone M1, in this embodiment, preferably, signal enhancement processing is performed on the call voice and the background noise that are collected by the first microphone M1, to use the processed call voice and background noise as the first audio signal.

S13: The noise reduction chip performs noise reduction processing on the first audio signal according to the second audio signal.

Based on that all audio signals (sounds) all consist of corresponding spectrums, and a spectrum of the background noise is different from that of the call voice, in this embodiment, when noise reduction processing is performed, firstly, a segment of an audio signal is acquired from a spectrum of the first audio signal, the segment of the audio signal has a same spectrum as the background noise included in the second audio signal, then reciprocal difference by 180° is performed on a phase of a spectrum of the segment of the audio signal, and at last, the spectrum of the audio signal after reciprocal difference is performed on a phase and a location corresponding to the spectrum of the first audio signal are merged, so that a spectrum of the corresponding background noise in the first audio signal can be eliminated, so as to complete filtering processing on the first audio signal according to the second audio signal and achieve an objective of eliminating the background noise and keeping only the call voice.

Afterwards, the next circuit of the terminal 20 (of the calling party) transmits the first audio signal, that is, the call voice, on which noise reduction processing is performed, to the terminal 20 of the called party by using a communication network and the headset 10 of the called party or a player of the terminal 20 of the called party plays the first audio signal, so that a call voice received by the called party is the nearest to a call voice made by the calling party.

Based on the above, it can be known that in this embodiment, the first microphone M1 disposed on the headset 10 acquires a first audio signal including a call voice and background noise, and the second microphone M2 disposed on the headset 10 acquires a second audio signal including the background noise, so that the headset 10 can independently acquire the background noise, so that the noise reduction chip 21 can perform filtering processing on the first audio signal including the call voice and the background noise according to the background noise, thereby implementing noise reduction processing of eliminating the background noise and keeping only the call voice, and improving call quality. In addition, compared with the prior art, in this embodiment, a new noise reduction chip does not need to be added on the headset 10, and the noise reduction chip 21 built in the terminal 20 is used to complete noise reduction processing. Therefore, a cost of the headset 10 and a cost of whole noise reduction processing are lowered, thereby facilitating popularization.

Figure 3:
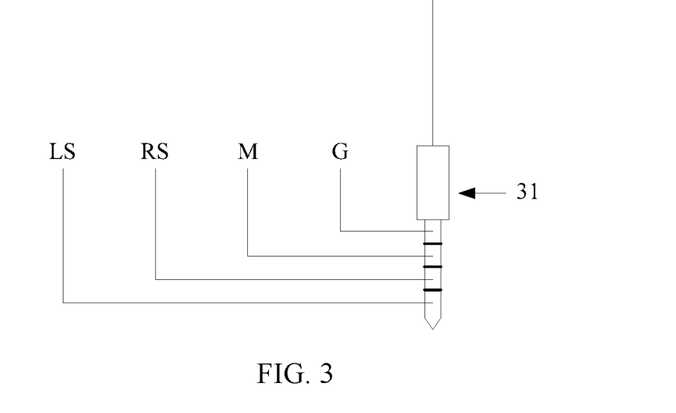
FIG. 3 is a schematic structural diagram of a second embodiment of an external plug of the headset shown in FIG. 2.

The present invention further provides a method for processing an audio signal of a second embodiment, which is described in detail based on the method for processing an audio signal disclosed in the first embodiment. This embodiment differs from the method for processing an audio signal of the first embodiment in that:

A pin structure 30 of the headset 10 used in this embodiment is a four-segment pin structure, that is, as shown in FIG. 3, the external plug 31 includes, sequentially along a direction of plug connection to the external socket 32, a grounding port G, a microphone port M connected to the first microphone M1 and the second microphone M2, and a left-channel port LS and a right-channel port RS that are respectively correspondingly connected to the left-channel headset S2 and the right-channel headset S2. Correspondingly, the external socket 32 includes interface structures adapted to the ports of the external plug 31, for example, includes a microphone interface adapted to the microphone port M.

That is, in this embodiment, the first audio signal acquired by the first microphone M1 and the second audio signal acquired by the second microphone M2 are transmitted to the noise reduction chip 21 of the terminal 20 by using only one microphone port M; therefore, first, two analog signals, that is, the first audio signal and the second audio signal, need to be digitized separately, and then a serial digital signal that can be transmitted on one line is obtained by means of digital encapsulation, to complete step S12. Specifically:

When the headset 10 performs analog-to-digital conversion on the first audio signal and the second audio signal, an analog-to-digital converter that outputs a digital signal of a type, for example, 1-bit, 4-bit, or 16-bit Σ-Δ and a pipeline may be used, and preferably, the analog-to-digital converter is built in the inline control module 40 of the headset 10.

When data encapsulation is performed on the first audio signal and the second audio signal on which analog-to-digital conversion is performed to obtain the serial digital signal, a manner of data encapsulation such as AES3 may be used to obtain the serial digital signal. In addition, in this embodiment, preferably, the serial digital signal obtained by encapsulation sequentially includes a header, an actual load, and a parity bit.

The header includes synchronization information and clock information, which are used to ensure that a first audio signal and a second audio signal that are received by the terminal 20 are synchronous with a first audio signal and a second audio signal that are output by the headset 10 in a transmission sequence and identify start moments and end moments of transmitting the first audio signals and the second audio signals.

The actual load includes a first audio signal and a second audio signal that need to be transmitted.

The parity bit includes a check code, which is mainly used for the terminal 20 to verify validity and integrity of the received serial digital signal, to ensure that the first audio signal and the second audio signal received by the terminal 20 are not damaged or lost.

It should be understood that the structure included in the serial digital signal and the location sequence of the header, the actual load, and the parity bit are only used as an example for illustration; the present invention may use other manners of data encapsulation according to specific data encapsulation requirements, and is not limited to the AES3 encapsulation manner used as an example in the foregoing content. It should be noted that a type of the analog-to-digital converter used in this embodiment and a quantity of bits of the output digital signal are determined by a manner of data encapsulation. In addition, a working voltage of the analog-to-digital converter comes from feeding of the terminal 20 to the headset cable by using the external socket 32. Based on the above, this embodiment may provide more power support to other devices, such as the analog-to-digital converter, on the headset cable by increasing a feeding voltage value.

Correspondingly, after the terminal 20 receives, by using the microphone interface of the external socket 32, an input signal transmitted by the headset 10, firstly, the terminal 20 identifies whether the input signal includes a header of a serial digital signal; if the terminal identifies that the input signal includes the header, the terminal determines that the input signal is a serial digital signal including the first audio signal and the second audio signal on which analog-to-digital conversion is performed and on which data encapsulation is performed; then the terminal 20 demodulates the input signal to obtain the first audio signal and the second audio signal that are included in the serial digital signal.

Based on the above, it can be known that, in addition to beneficial effects of the first embodiment, the headset 10 of this embodiment can further be compatible with the terminal 20 including a traditional four-pin external socket, thereby better facilitating popularization.

Figure 4:
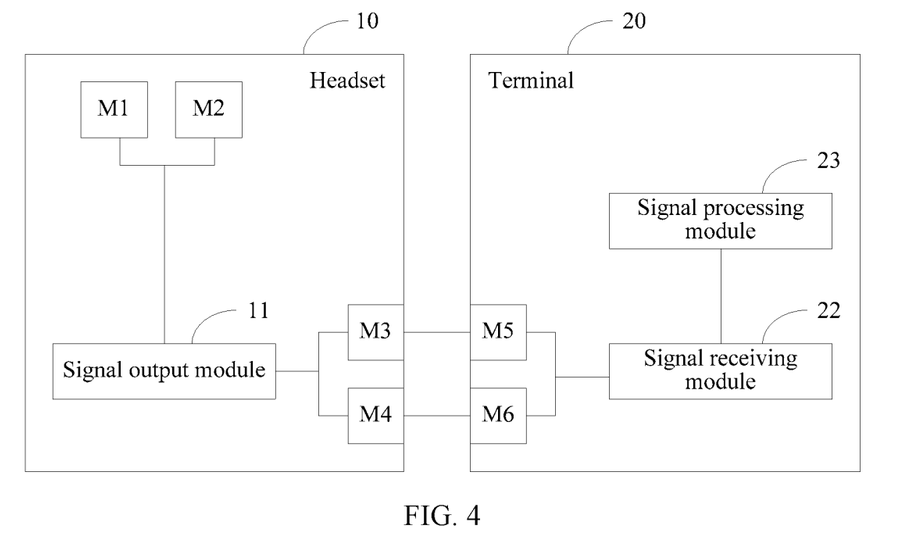
FIG. 4 is a principal block diagram of a system for processing an audio signal according to a first embodiment of the present invention.

The present invention further provides a system for processing an audio signal, including the headset 10, the terminal 20, and the five-segment pin structure 30 that are shown in FIG. 2. As shown in FIG. 4, in this embodiment, based on FIG. 2, the headset 10 further includes a signal output module 11, and the terminal 20 further includes a signal receiving module 22 and a signal processing module 23.

Referring to FIG. 2 and FIG. 4, the first microphone M1 is configured to acquire, in a call process, a first audio signal including a call voice and background noise, and the second microphone M2 is configured to acquire, in the call process, a second audio signal including the background noise.

The signal output module 11 is configured to transmit the first audio signal and the second audio signal to the terminal 20 by using the external plug 31. Specifically, the signal output module 11 is configured to transmit the first audio signal to the terminal 20 by using the first microphone port M3 and transmit the second audio signal to the terminal 20 by using the second microphone port M4.

The signal receiving module 22 is configured to receive, by using the external socket 32, an input signal, that is, the first audio signal and the second audio signal, transmitted by the headset 10. Specifically, the signal receiving module 22 is configured to receive, by using a first microphone interface M5, the first audio signal transmitted by the headset 10 by using the first microphone port M3 and receive, by using a second microphone interface M6, the second audio signal transmitted by the headset 10 by using the second microphone port M4.

The signal processing module 23 is configured to control the noise reduction chip 21 to perform noise reduction processing on the first audio signal according to the second audio signal.

Figure 5:
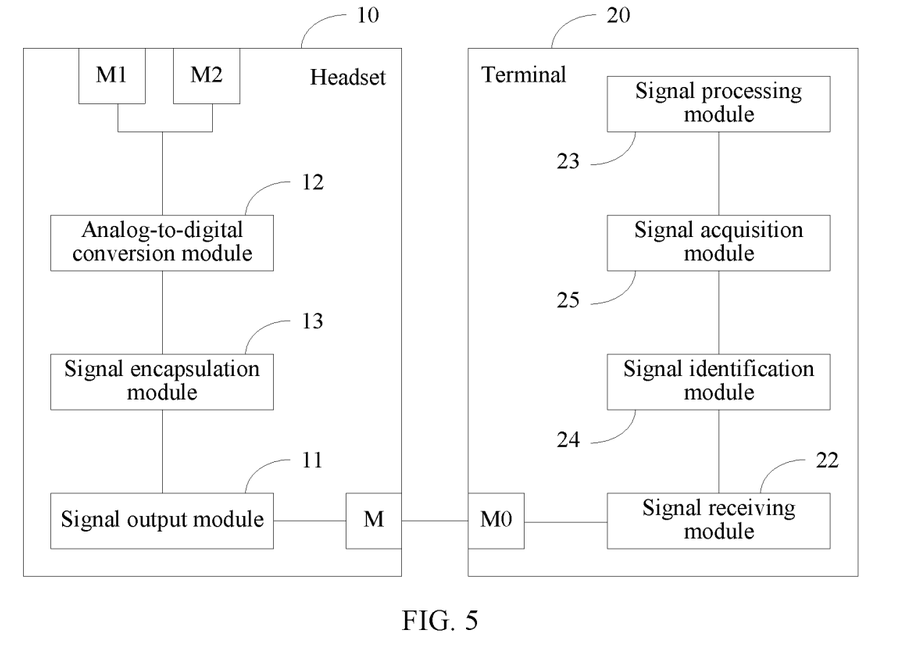
FIG. 5 is a principal block diagram of a system for processing an audio signal according to a second embodiment of the present invention.

The present invention further provides a system for processing an audio signal of a second embodiment, including the headset 10 and the terminal 20 that are shown in FIG. 2 and the four-segment pin structure 30 shown in FIG. 3; this embodiment is described in detail based on the system for processing an audio signal of the first embodiment. As shown in FIG. 5, this embodiment differs from the first embodiment in that:

The headset 10 further includes an analog-to-digital conversion module 12 and a signal encapsulation module 13, and the terminal 20 further includes a signal identification module 24 and a signal acquisition module 25.

In this embodiment, the first microphone M1 is configured to acquire, in a call process, a first audio signal including a call voice and background noise, and the second microphone M2 is configured to acquire, in the call process, a second audio signal including the background noise.

The analog-to-digital conversion module 12 is configured to perform analog-to-digital conversion on the first audio signal and the second audio signal.

The signal encapsulation module 13 is configured to perform data encapsulation on the first audio signal and the second audio signal on which analog-to-digital conversion is performed, to obtain a serial digital signal.

The signal output module 11 is configured to transmit the serial digital signal to the terminal 20 by using the external plug 31, that is, transmit the serial digital signal to the terminal 20 by using the microphone port M.

The signal receiving module 22 is configured to receive, by using the external socket 32, an input signal transmitted by the headset 10, that is, receive, by using a microphone interface M0, an input signal transmitted by the headset 10 by using the microphone port M, where the input signal is a serial digital signal. Then, the signal identification module 24 is configured to identify whether the input signal received by the signal receiving module 22 is a serial digital signal including the first audio signal and the second audio signal.

If the input signal received by the signal receiving module 22 is a serial digital signal including the first audio signal and the second audio signal, the signal acquisition module 25 demodulates the input signal, to obtain the first audio signal and the second audio signal that are included in the serial digital signal.

The signal processing module 23 is configured to control the noise reduction chip 21 to perform noise reduction processing on the first audio signal according to the second audio signal.

It should be noted that the system for processing an audio signal, the headset 10, and the terminal 20 in the foregoing several embodiments of the present invention correspond to the method for processing an audio signal based on the foregoing embodiments and therefore may have same technical effects. In addition, it should be understood that a division of disclosed description modules of the headset 10 and the terminal 20 is only a division for logical functions and may be another division manner in actual implementation. For example, multiple modules may be combined or integrated to another system, or some features may be omitted or not to be executed. In addition, coupling or communication connection between modules may use some interfaces or may be in an electric manner or other manners.

Further, as constituent parts of the headset 10 and the terminal 20, the foregoing functional modules may be or may not be physical frames, may be located in a same place or may be distributed on multiple network units, and may be implemented by using a hardware form or may be implemented by using a software functional frame. The objective of the solution of the present invention may be implemented by selecting some or all of the modules according to actual requirements.

Figure 6:
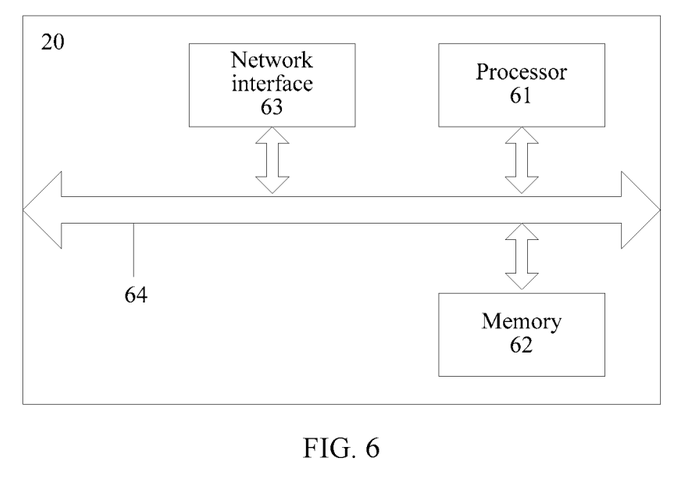
FIG. 6 is a principal block diagram of a system for processing an audio signal according to a third embodiment of the present invention.

The present invention further provides a system for processing an audio signal of a third embodiment, including the headset 10 and the terminal 20 that are shown in FIG. 2. As shown in FIG. 6, the terminal 20 of this embodiment includes a processor 61, a memory 62, a network interface 63, and a bus 64, where the processor 61, the memory 62, and the network interface 63 are separately connected to the bus 64.

The network interface 63 is configured to receive a first audio signal and a second audio signal that are transmitted by the headset 10 by using an external plug 31.

The memory 62 is configured to record the first audio signal and the second audio signal.

The memory 62 further stores a program, used to generate a response message, where the response message includes an instruction for controlling a noise reduction chip 21 to perform noise reduction processing on the first audio signal according to the second audio signal.

The processor 61 runs the program.

The network interface 63 is configured to send the response message to the noise reduction chip 21 according to the first audio signal and the second audio signal that are transmitted by the headset 10, so that the noise reduction chip 21 performs noise reduction processing on the first audio signal according to the second audio signal.

It should be noted that if the system for processing an audio signal of this embodiment is implemented in a form of software functional units and are sold or used as an independent product, the system for processing an audio signal may be stored in a computer readable storage medium. Based on such an understanding, the technical solutions of the present invention essentially, or the part contributing to the prior art, or all or some of the technical solutions may be implemented in the form of a computer software product. The computer software product is stored in a storage medium and includes several instructions for instructing a computer device (which may be a personal computer, a server, a network device, or the like) or a processor (processor) to perform all or some of the steps in the embodiments of the method for processing an audio signal of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A method for processing an audio signal of a headset, wherein the headset comprises a first microphone and a second microphone, the method comprising:
acquiring, by the first microphone, a first audio signal comprising a call voice and background noise;
acquiring, by the second microphone, a second audio signal comprising the background noise; and
transmitting the first audio signal and the second audio signal to an external terminal that performs noise reduction processing on the first audio signal according to the background noise in the second audio signal.

2. The method for processing an audio signal according to claim 1, wherein the headset comprises a left-ear headset unit, a right-ear headset unit, and an inline controller, the second microphone is disposed on at least one of the left-ear headset unit or the right-ear headset unit, and the first microphone is disposed on the inline controller.

3. The method for processing an audio signal according to claim 1, wherein the headset is connected with the external terminal through an external plug, the external plug comprises a first microphone port and a second microphone port, and the step of transmitting the first audio signal and the second audio signal comprises:
transmitting the first audio signal to the external terminal by using the first microphone port of the external plug; and
transmitting the second audio signal to the external terminal by using the second microphone port of the external plug.

4. The method for processing an audio signal according to claim 1, wherein the headset is connected with the external terminal through an external plug, the external plug comprises a microphone port, and the step of transmitting the first audio signal and the second audio signal comprises:
performing analog-to-digital conversion on the first audio signal and the second audio signal;
performing data encapsulation on the first audio signal and the second audio signal after analog-to-digital conversion is performed to obtain a serial digital signal; and
transmitting the serial digital signal to the external terminal by using the microphone port of the external plug.

5. The method for processing an audio signal according to claim 1, wherein the first audio signal and the second audio signal are acquired in a same call process.

6. The method for processing an audio signal according to claim 1, wherein the external terminal comprises a built-in noise reduction chip, and the built-in noise reduction chip is used to perform the noise reduction processing on the first audio signal according to the second audio signal.

7. A headset, comprising:
a first microphone that is configured to acquire a first audio signal comprising a call voice and background noise;

a second microphone that is configured to acquire a second audio signal comprising the background noise;

an external plug configured to connect to an external terminal; and a signal output transmitter, configured to transmit the first audio signal and the second audio signal to the external terminal that performs noise reduction processing on the first audio signal according to the background noise in the second audio signal.

8. The headset according to claim 7, wherein the headset further comprises a left-ear headset unit, a right-ear headset unit, and an inline controller, the second microphone is disposed on at least one of the left-ear headset unit or the right-ear headset unit, and the first microphone is disposed on the inline controller.

9. The headset according to claim 7, wherein the headset is connected with the external terminal through an external plug, the external plug comprises a first microphone port and a second microphone port that respectively correspond to the first microphone and the second microphone; and the signal output transmitter is configured to transmit the first audio signal by using the first microphone port and transmit the second audio signal by using the second microphone port.

10. The headset according to claim 7, wherein the headset is connected with the external terminal through an external plug, the external plug comprises a microphone port, and the headset further comprises an analog-to-digital converter, and a signal encapsulator, wherein the analog-to-digital converter is configured to perform analog-to-digital conversion on the first audio signal and the second audio signal;

the signal encapsulator is configured to perform data encapsulation on the first audio signal and the second audio signal after analog-to-digital conversion is performed to obtain a serial digital signal; and the signal output transmitter is configured to transmit the serial digital signal to the external terminal by using the microphone port.

11. The headset according to claim 7, wherein the first microphone and the second microphone are configured to acquire the first audio signal and the second audio signal, respectively, in a same call process.

12. The headset according to claim 7, wherein the external terminal comprises a built-in noise reduction chip, and the built-in noise reduction chip is used to perform the noise reduction processing on the first audio signal according to the second audio signal.

13. A method for processing an audio signal of a terminal, the method comprising:

receiving, by the terminal, an input signal transmitted by a headset, wherein the headset comprises a first microphone and a second microphone, the input signal comprises a first audio signal and a second audio signal, the first audio signal is acquired by the first microphone, the first audio signal comprises a call voice and background noise, a second audio signal is acquired by the second microphone and the second audio signal comprises the background noise;

acquiring the first audio signal and the second audio signal according to the input signal; and performing noise reduction processing on the first audio signal according to the background noise in the second audio signal.

14. The method for processing an audio signal according to claim 13, wherein the headset comprises an external plug that connects to an external socket of the terminal, the external plug comprises a first microphone port and a second microphone port that respectively correspond to the first microphone and the second microphone, the external socket comprises a first microphone interface corresponding to the first microphone port and a second microphone interface corresponding to the second microphone port, and the step of receiving, by using the external socket, an input signal transmitted by the headset and the step of acquiring the first audio signal and the second audio signal according to the input signal comprise:

receiving, by using the first microphone interface, the first audio signal transmitted by the first microphone port and receiving, by using the second microphone interface, the second audio signal transmitted by the second microphone port.

15. The method for processing an audio signal according to claim 13, wherein the headset comprises an external plug that connects to an external socket of the terminal, the external plug comprises a microphone port, the external socket comprises a microphone interface corresponding to the microphone port, and the step of receiving, by using the external socket, an input signal transmitted by the headset and the step of acquiring the first audio signal and the second audio signal according to the input signal comprise:

receiving, by using the microphone interface, the input signal transmitted by the microphone port;

identifying that the input signal is a serial digital signal comprising the first audio signal and the second audio signal; and demodulating the input signal in response to identifying that the input signal is a serial digital signal comprising the first audio signal and the second audio signal, to obtain the first audio signal and the second audio signal that are comprised in the serial digital signal.

16. The method for processing an audio signal according to claim 13, wherein the first audio signal and the second audio signal are acquired in a same call process.

17. The method for processing an audio signal according to claim 13, wherein the terminal comprises a built-in noise reduction chip, and the built-in noise reduction chip is used to perform the noise reduction processing on the first audio signal according to the second audio signal.

18. A terminal, wherein the terminal comprises a built-in noise reduction chip, the terminal configured to connect to a headset external to the terminal, the headset comprises a first microphone and a second microphone, and the terminal further comprises:

a signal receiver, configured to receive an input signal transmitted by the headset, wherein the input signal comprises a first audio signal and a second audio signal, the first audio signal is acquired by the first microphone in a call process, the first audio signal comprises a call voice and background noise, a second audio signal is acquired by the second microphone in the call process and the second audio signal comprises the background noise;

a signal acquirer, configured to acquire the first audio signal and the second audio signal according to the input signal; and a signal processor, configured to control the noise reduction chip to perform noise reduction processing on the first audio signal according to the background noise in the second audio signal.

19. The terminal according to claim 18, wherein the headset comprises an external plug that connects to an external socket of the terminal, the external plug comprises a first microphone port and a second microphone port that respectively correspond to the first microphone and the second microphone, the external socket comprises a first microphone interface corresponding to the first microphone port and a second microphone interface corresponding to the second microphone port, and the signal receiver is configured to receive, by using the first microphone interface, the first audio signal transmitted by the first microphone port, receive, by using the second microphone interface, the second audio signal transmitted by the second microphone port, and transmit the first audio signal and the second audio signal to the signal acquirer.

20. The terminal according to claim 18, wherein the headset comprises an external plug that connects to an external socket of the terminal, the external plug comprises a microphone port, the external socket comprises a microphone interface corresponding to the microphone port, and the terminal further comprises a signal identifier, wherein
   the signal identifier is configured to identify whether the input signal received by the signal receiver is a serial digital signal comprising the first audio signal and the second audio signal; and
   the signal acquirer demodulates the input signal if the input signal received by the signal receiver is a serial digital signal comprising the first audio signal and the second audio signal, to obtain the first audio signal and the second audio signal that are comprised in the serial digital signal.

* * * * *